June 9, 1953  R. H. PARK ET AL  2,641,184
STREAMLINE DEPTH CHARGE
Filed Aug. 25, 1942  5 Sheets-Sheet 1
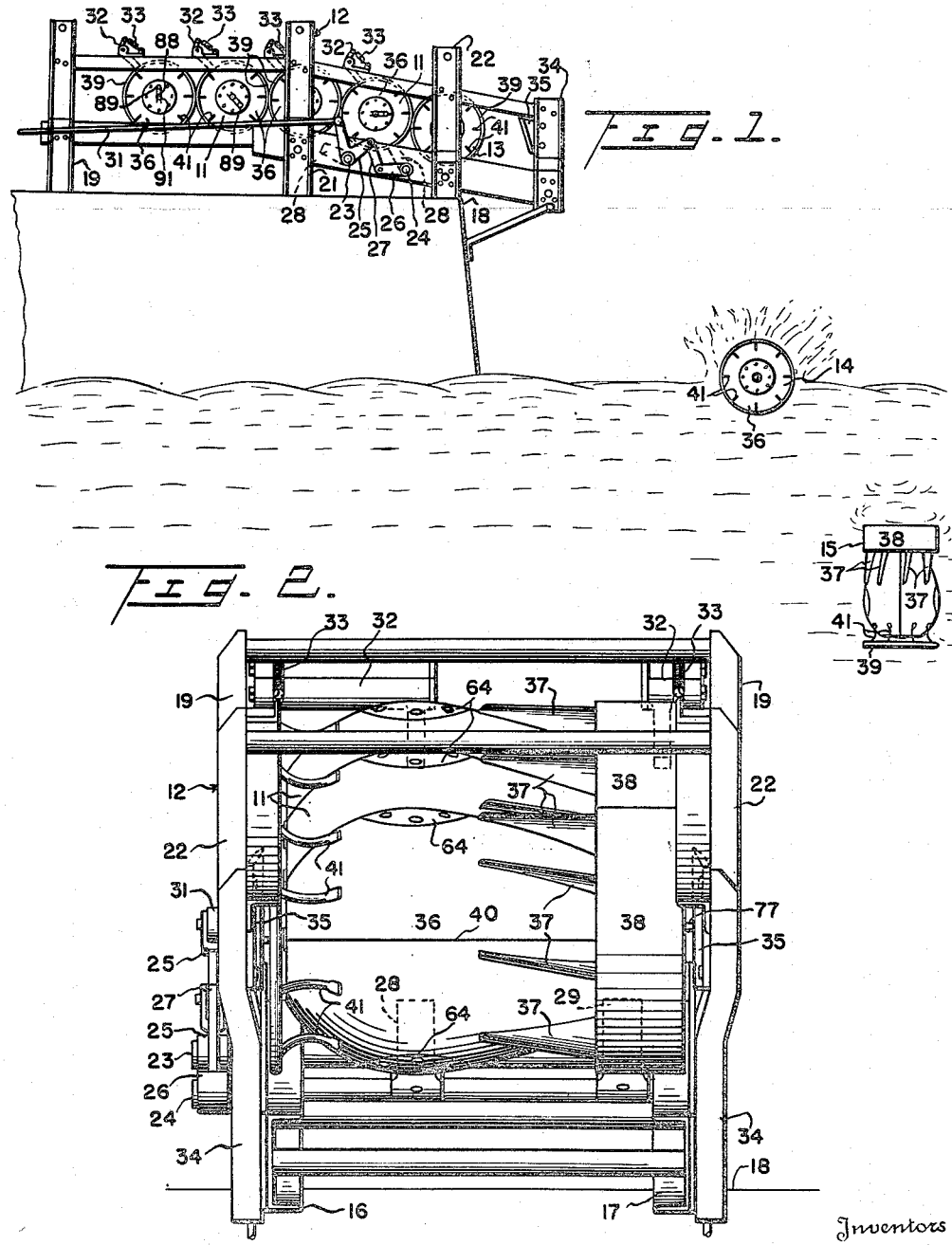
Inventors
R. H. PARK
R. WELLER
A. G. RUSSELL
S. W. BOOTH

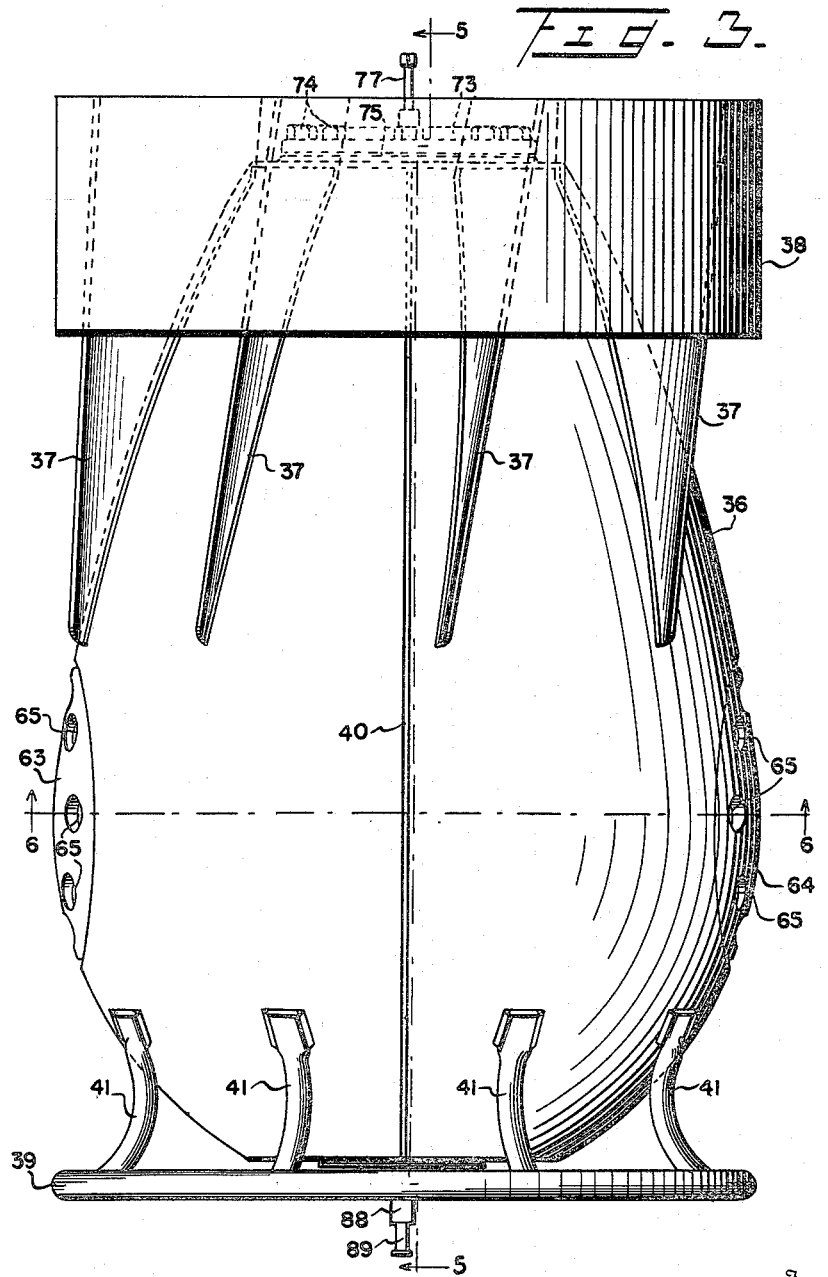

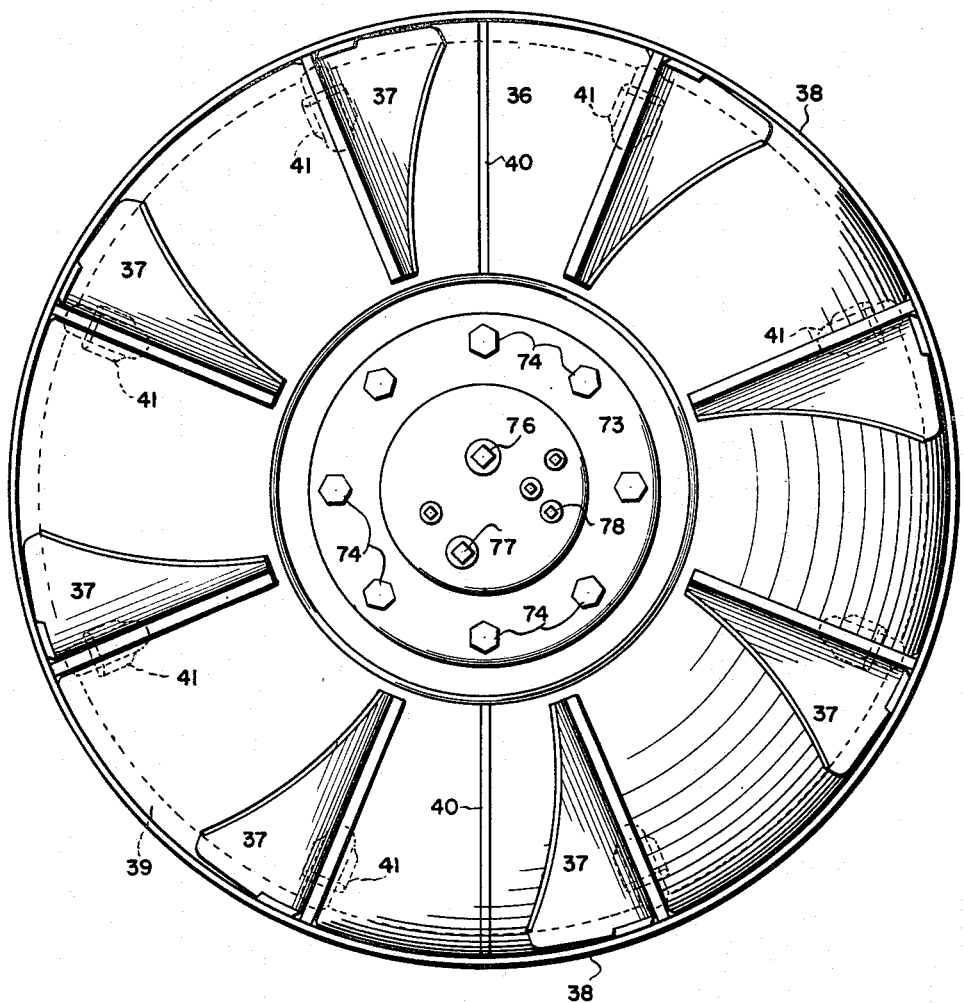

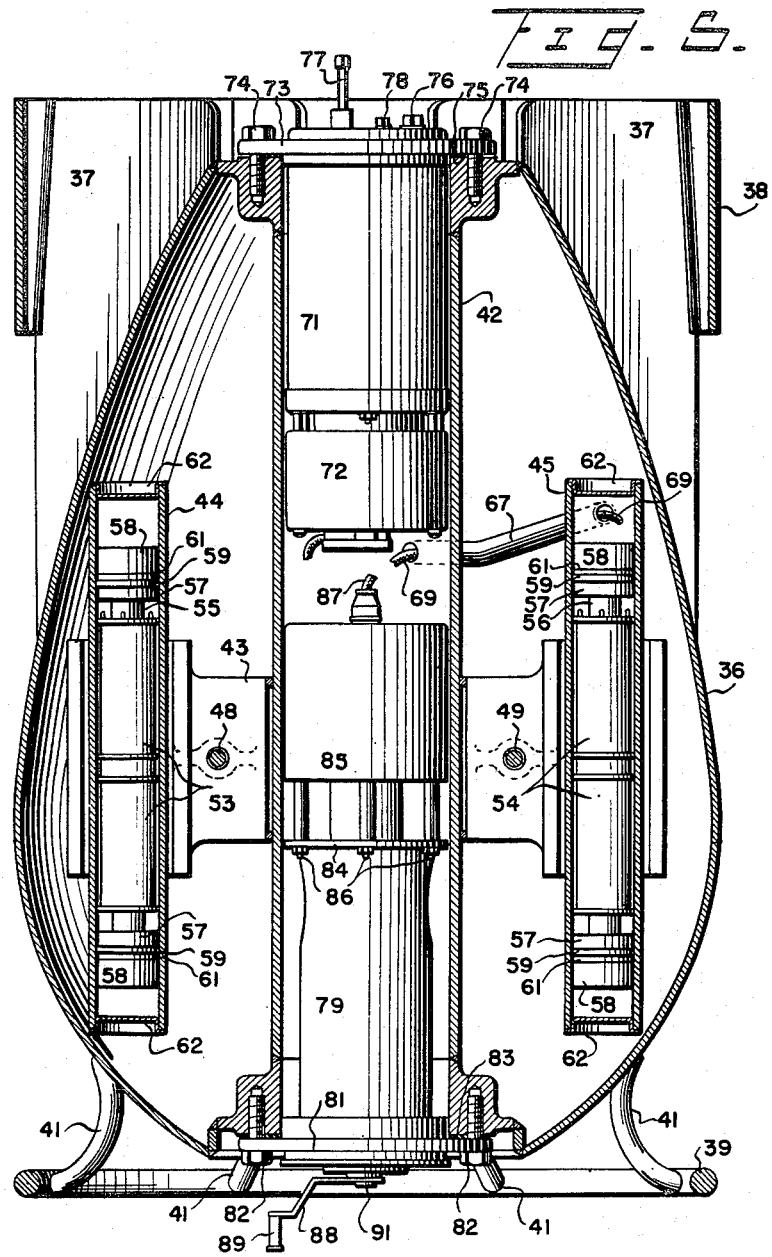

June 9, 1953

R. H. PARK ET AL 2,641,184

STREAMLINE DEPTH CHARGE

Filed Aug. 25, 1942

Inventors
R. H. PARK
R. WELLER
A. G. RUSSELL
S. W. BOOTH

By

Attorney

Patented June 9, 1953

2,641,184

UNITED STATES PATENT OFFICE 2,641,184

STREAMLINE DEPTH CHARGE

Robert H. Park, Pluckemin, N. J., Royal Weller, Pullman, Wash., Arthur G. Russell, Arlington, Va., and Seth W. Booth, Hyattsville, Md.

Application August 25, 1942, Serial No. 456,048

11 Claims. (Cl. 102—7)

(Granted under Title 35, U. S. Code (1952), sec. 266)

This invention relates to a depth charge adapted to be launched within a body of water from an attacking craft. More specifically, the invention relates to a depth charge of new and improved design adapted to be rolled along a track or runway arranged on a vessel from which the depth charge is released and in which the depth charge quickly assumes a vertical position within the water after being launched and sinks within the water along a predetermined path of travel at a relatively high rate of speed without substantial deviation from the line of travel.

In depth charge devices of the types heretofore proposed, the casing is generally cylindrical in shape and caused to be moved through the water endwise by reason of the provision of a heavy mass arranged at one end of the casing thereby to cause the center of gravity of the depth charge to be disposed near the weighted end of the depth charge. This type of depth charge possesses the disadvantage of relatively slow movement through the water by reason of the squared ends and cylindrical shape of the depth charge casing and, furthermore, the axis of the cylindrical type of depth charge has been found to deviate to a considerable extent from the path of travel of the depth charge due to wobble of the depth charge within the water caused by the vortical condition of the water adjacent thereto as the depth charge sinks within the water. The rate of descent of the depth charge within the water, as will be readily understood, is additionally retarded by this wobbling motion.

In the arrangement of the present invention the casing of the depth charge is formed along approved hydrodynamic lines in such a manner that the depth charge moves within the water with a minimum of resistance and at a considerably increased rate of travel. The depth charge is maintained in a predetermined position with respect to the path of travel within the water by reason of the provision of a plurality of fins or flight members secured to the trailing portion of the depth charge casing and a cylindrical sleeve or collar arranged about the fins and secured thereto, the collar also serving as a traction element by means of which the depth charge is rolled along the runway prior to launching of the depth charge within the water. There is secured to the leading end of the depth charge casing as by a plurality of supports a metal ring of the same diameter as the aforesaid annular member thereby to provide a structure in which the depth charge may be rolled along the deck of the vessel or a launching track, as the case may be. The ring secured to the leading end of the casing is also employed to impart an additional weight to the leading end of the depth charge thereby to provide a structure in which the center of gravity of the depth charge is near the leading end. The shape of the casing and the provision of the cylindrical collar thereon combined with the disposition of the center of gravity near the leading end thereof causes the depth charge to assume an upright position within the water quickly and to assist the depth charge in moving rapidly through the water by reason of the gravitational force acting thereon.

The depth charge is adapted to be exploded by a suitable firing mechanism such, for example, as the firing control mechanism for a depth charge disclosed in an application for United States Letters Patent of W. S. Macdonald et al. for Firing Control Mechanism for a Depth Charge, Serial No. 453,550, filed August 4, 1942, in which the gradient of the magnetic field adjacent a submarine is employed to fire the depth charge at the depth of submergence of the submarine. In the event that the submarine is not disposed within the zone of destruction of the depth charge during the downward movement thereof through the water, the explosion of the depth charge by the aforesaid firing control mechanism is prevented and the depth charge continues to sink within the water beyond the depth of submergence of the submarine until the depth charge has reached a predetermined depth of submersion within the water. When this occurs, the depth charge is exploded by a percussion type of detonating device controlled by the pressure of the water within which the depth charge is launched.

The depth charge is provided with a pair of detachable devices adapted to be released by striking against a projecting portion of the launching runway or track or secured adjacent thereto in such a manner that the devices are automatically detached as the depth charge rolls along the runway during the launching operation thereof. These detachable safety devices are employed to maintain the depth charge in an unarmed condition prior to the launching of the same thereby to prevent the premature explosion of the depth charge until the launching operation has been completed.

One of the objects of the present invention is the provision of a new and improved depth charge in which the rate of travel of the depth charge through the water is substantially increased.

Another of the objects is the provision of a depth charge in which means are provided for preventing substantial deviation of the depth charge from a predetermined path of travel of the depth charge within a body of water.

Another object is the provision of a new and improved casing of streamlined design for a depth charge having means secured thereto for enabling a plurality of depth charges to be loaded on to a launching track and released selectively therefrom in succession.

Another object is the provision of a new and improved depth charge structure adapted to be launched in a horizontal position within a body of water and quickly assume a vertical position within the water during the downward movement of the depth charge therein.

Another object is the provision of an improved depth charge structure in which means are provided for causing the depth charge to be given a rotary motion during movement of the depth charge within the water.

A further object is the provision of a new and improved depth charge structure in which means are provided for imparting a continuous rotary motion to the depth charge during the descent of the depth charge within the water in which the depth charge is quickly accelerated to the maximum speed of rotation and rate of descent after striking the water.

A still further object is the provision of an improved depth charge structure which would be economical to manufacture, reliable in operation and which possesses all of the qualities of compactness, ruggedness and durability.

Still other objects, advantages and improvements will be apparent from the following description taken in connection with the accompanying drawings of which:

Fig. 1 is a view in elevation of a plurality of depth charges in accordance with the present invention and launching means therefor;

Fig. 2 is an end view somewhat enlarged of the launching mechanism and depth charges of Fig. 1 adapted to be selectively released thereby;

Fig. 3 is an enlarged view of a depth charge in accordance with a preferred embodiment of the invention;

Fig. 4 is a plan view somewhat enlarged of the depth charge of Fig. 3;

Fig. 5 is a view in section taken substantially along the line 5—5 of Fig. 3; and, Fig. 6 is a view somewhat enlarged taken along the line 6—6 of Fig. 3.

Figure 6:
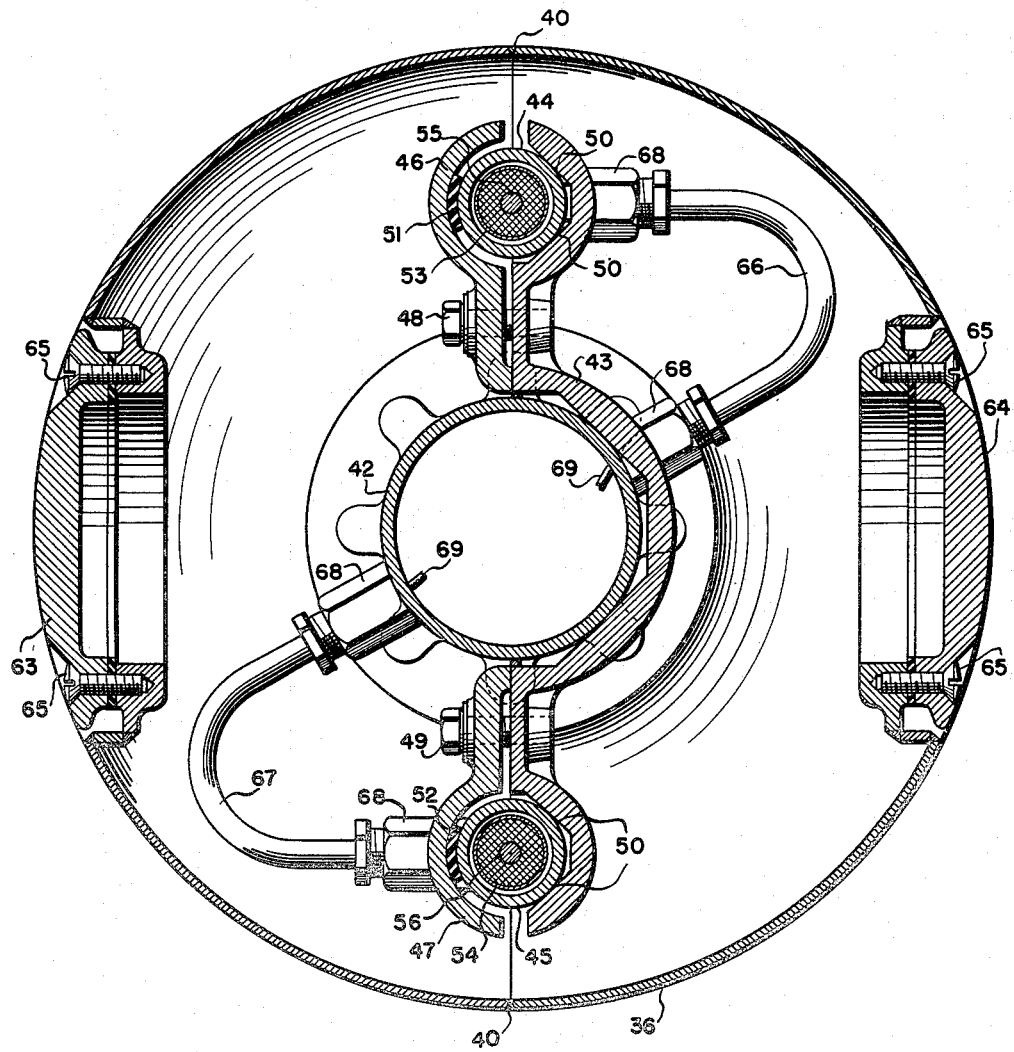

Referring now to the drawings and more particularly to Fig. 1 thereof there is shown thereon a plurality of depth charges 11 held in a locked position upon a launching device 12, a depth charge 13 about to be launched from the launching mechanism, a depth charge 14 at the moment of striking the water and a depth charge 15 after the depth charge has assumed a vertical position within the water during the descent thereof through the water. The launching mechanism comprises a pair of track members 16 and 17 along which the depth charges are adapted to roll under the influence of the force of gravity by reason of an angle of inclination of the track members with respect to a horizontal plane, the track members being secured to the deck of the vessel 18 as by the supports 19, 21 and 22. The launching device is provided with a release mechanism comprising a pair of rotatable shafts 23 and 24 having bell cranks 25 and 26 respectively secured thereto, a link member 27 being employed to communicate motion from the bell crank 25 to the shaft 24. The shaft 24 has secured thereto a pair of stop devices 28 and 29 adapted to prevent the release of the depth charges 11 until the stop devices have been rotated from the path of travel of the depth charges by movement of the rod 31 which may be accomplished in any well known manner such, for example, as by a manual operation or the operation of a remote control device operatively connected thereto. There is also preferably provided a plurality of latch members 32 adapted to be urged by the springs 33 secured thereto into the position shown in Fig. 1 thereby to prevent movement of the depth charges reversely prior to the launching of the same. There is also secured to the members 34 a pair of obstruction devices 35 adapted to engage a pair of safety devices arranged on each of the depth charges and detach the safety devices therefrom as the depth charge rolls past the obstruction devices thereby arming the depth charge during the launching operation aforesaid.

On Fig. 3 is shown an enlarged view of one of the depth charges of Fig. 1 in which the casing thereof is designated by the numeral 36, the casing being composed preferably of non-magnetic material suitable for the purpose such, for example, as aluminum, stainless steel, manganese steel or the like. The casing is preferably formed in two parts welded together as at 40 and provided with an impeller comprising a plurality of flights or fin members 37 secured thereto at an angle in any suitable manner as by welding the parts together such that the depth charge is caused to rotate or spin about an axis coincident with the path of travel of the depth charge through the water. A cylindrical member 38 is secured to the fins 37 thereby to provide means coacting with the annular member 39 for enabling the depth charge to roll along a surface such as the deck of a vessel or the launching rack of Figs. 1 and 2. The annular member 39, as heretofore stated, is composed preferably of metal and secured to the depth charge casing 36 as by the supporting members 41 secured thereto.

Arranged within the casing 36 in coaxial relation therewith is a tubular member 42, Figs. 5 and 6, to which is affixed as by welding the parts together a rigid bracket or support 43 adapted to receive a pair of tubular devices 44 and 45 clamped thereto as by the members 46 and 47 and bolts 48 and 49, a pair of resilient spacing devices 51 and 52 of insulating material suitable for the purpose such, for example, as rubber being employed between the clamping members 46 and 47 and the tubular members 44 and 45 respectively. The support 43 is preferably formed as at 50 thereby to insure that the tubular members 44 and 45 will be in exact parallel alinement when the members 46 and 47 are clamped by the bolts 48 and 49 respectively. The tubular members 44 and 45 are adapted to receive and support a pair of opposedly connected induction pickup coils 53 and 54 arranged about a pair of bars or rods 55 and 56 respectively of suitable ferromagnetic material such, for example, as a material known in the trade as "4-79 Permalloy" having a composition of substantially 79 percent nickel, 4 percent molybdenum and 17 percent iron. The magnetic bars 55 and 56 are maintained in predetermined spaced relation with respect to the tubular members 44 and 45 by reason of the provision of a plurality of clamping devices 57 secured to the ends of the bars, each of the clamping devices having a nut 58 threaded thereon adapted to compress a yieldable washer or bushing 59 sufficiently to cause the spacing member to engage the inner surface of the tubular members 44 and 45 and thereby clamp the rods yieldably to the tubular members as the nuts 58 are tightened, a washer 61 being preferably provided between each of the nuts 58 and bushings 59. The clamping devices 57 including the nuts 58, bushings 59 and washers 61 are composed of a suitable non-magnetic material such, for example, as "Bakelite" thereby to prevent the flow of eddy currents therein. The tubular members 44 and 45 are sealed at the ends thereof by suitable caps 62. The depth charge casing 36 is adapted to be loaded with an explosive charge through suitable apertures provided within the casing, Figs. 3 and 6, the apertures being adapted to be closed by a pair of covers 63 and 64 maintained in sealed relation with respect to the casing 36 by the screws 65.

There is also provided a pair of tubular members 66 and 67, Fig. 6, secured to the tubular members 42, 44 and 45 as by the coupling devices 68 adapted to receive and protect a plurality of electrical conductors within the cables 69, Fig. 5, respectively associated with each of the members 66 and 67 whereby an external circuit is established between the induction pickup devices 53, 54 and the firing control mechanism 71, Fig. 5. The firing control device 71 is provided with a source of electrical energy such, for example, as a plurality of dry cells arranged within a casing 72, the firing mechanism and electrical source of power being supported by a plate or cap 73 secured to the casing 36 as by the bolts 74, a suitable gasket 75 being provided to insure a watertight joint therebetween. Within the cap 73 is provided a plurality of hydrostatic devices adapted to be controlled by the pressure of the water within which the depth charge is launched, access to these hydrostatic devices being established by removal of the plug 76 and the removal of the safety pin 77 by striking against one of the obstruction devices 35, Figs. 1 and 2, as the depth charge is released from the launching device.

There is also provided within the cap 73 a removable plug 78 whereby a key or crank may be inserted within the cap 73 after the plug 78 has been removed and a spring motor employed with the firing mechanism may be wound. The spring motor, when released for operation by one of the aforesaid hydrostatic devices, causes a pair of electrical contacts to close impulsively thereby connecting the induction pickup coils 53 and 54 to the firing control mechanism periodically at predetermined intervals of time. The firing control mechanism 71 illustrated may be similar to the firing control mechanism disclosed and claimed in the copending application of W. S. Macdonald et al. for Firing Control Mechanism for a Depth Charge, Serial No. 453,550, filed August 4, 1942, although it will be understood that any other firing control mechanism suitable for the purpose may be employed with the depth charge casing of the present invention.

In operation, the pickup coils 53 and 54 are adapted to generate electrical signals variably in accordance with the gradient of a non-uniform magnetic field within which the depth charge travels such, for example, as may be caused by a submarine adjacent the path of travel of the depth charge. The induction pickup coils 53 and 54 are opposedly connected in series and balanced electrically and magnetically such that no substantial signal is generated by the joint action of the pickup coils as the depth charge moves within a uniform magnetic field. In the event that, for any reason, the gradiometer coils 53 and 54 are not perfectly balanced, the signal generated thereby as the coils move through a uniform magnetic field, as will be readily understood, is proportional to the deviation of the depth charge from a predetermined line of flight or, in other words, the amount of wobble of the depth charge within the water. The shape of the casing 36 combined with the fin members 37, cylindrical member 38 and the annular member 39 mutually coact to maintain the depth charge in a rotating condition in a predetermined path of travel without substantial deviation or wobble therefrom and thus the signals generated by the pickup coils 53 and 54 as the result of an unbalanced condition therebetween are reduced while the depth charge is moving within a uniform magnetic filed thereby preventing the possibility of premature firing of the depth charge as the result of wobble thereof within the water. Furthermore, by spinning the depth charge within the water in the manner described, an arrangement is provided in which the sensitivity of the gradiometer pickup coils is increased as the coils move within a gradient magnetic field and greater stability of travel of the depth charge during the flight thereof through the water is effected.

There is provided within the cylindrical member 42 a casing 79 comprising a flanged member 81 secured to the casing 36 as by the bolts 82, a gasket 83 preferably being arranged between the flanged member 81 and the casing 36 to prevent the leakage or seepage of water therebetween. The casing 79 is provided with a collar 84 to which is secured the casing 85 having an explosive charge therein, the bolts 86 being employed to maintain the casing 85 in the assembled position shown on the drawing. A detonating device arranged within the casing 79 is in electrical connection with the firing control mechanism 71 as by the conductors within the cable 87 whereby the detonating device is adapted to be fired in response to a signal received from the firing control mechanism 71 when the gradient of the magnetic field detected by the pickup coils 53 and 54 has reached a predetermined proportion. The aforesaid detonating device is preferably of the type adapted to be brought into operative relation with respect to the explosive charge arranged within the casing 85 in response to the operation of a hydrostat device, as is well known in the art to which the present invention pertains, the premature operation of the hydrostat device being prevented by a fork member 88 having a projecting portion 89 thereon adapted to be brought into engagement with one of the obstruction devices 35 on the launching apparatus employed with the depth charge thereby to cause the fork member 88 to be disengaged from the plunger 91 of the hydrostat mechanism with which the fork member is normally engaged. When this occurs, the plunger 91 is unlocked and the hydrostat mechanism is thereby adapted to respond to the pressure of the water within which the depth charge is immersed, the member 88 effectively preventing movement of the hydrostat device and the detonating device connected thereto prior to the launching of the depth charge.

Whereas in the embodiment of the invention shown on Fig. 5 a particular form of structure of the depth charge exploding mechanism is shown, it will be understood that this is by way of illustration only and that various other forms of explosive chambers and detonating devices therefor adapted to be brought into operative relation with an explosive charge in response to the pressure of the water within which the device is launched may be employed without departing from the spirit and scope of the present invention and the specific form of the explosive device and hydrostatically controlled means for inserting the detonating element within the explosive charge form no part of the present invention.

Furthermore, if desired, the detonating device may be of the type adapted to explode a percussion cap when the pressure of the water against the hydrostat element operatively connected thereto has been increased to a predetermined order of magnitude in the event that the path of travel of the depth charge within the water is not sufficiently near the submarine to cause the depth charge to be exploded by signals received from the gradiometer coils 53 and 54. It will also be understood that in any of the well known devices suitable for the purpose in which the depth of submersion at which the percussion cap is exploded by the hydrostat device may be set at will, means may be provided for adjusting the depth at which the percussion cap is exploded but such depth adjusting means forms no part of the present invention.

Briefly stated in summary, applicants have produced a depth charge suitable for use with launching devices now in general use by the marine forces of the United States of America in which the depth charge quickly assumes a vertical position in the water after being launched and in which the depth charge is caused to rotate continuously and sink within the water without substantial deviation or wobble from a predetermined line of travel, means being provided for causing the depth charge to move within the water at a relatively high rate of speed thereby to increase the probability of the depth charge finding and destroying the target.

It is not desired to limit the invention to the preferred embodiment thereof described herein, since it will be apparent to those skilled in the art, after understanding the invention, that it is susceptible to various other changes and modifications, such as may be made without departing from the spirit and scope of the invention, and it is intended therefore in the appended claims to cover all such changes and modifications.

The invention herein described and claimed may be manufactured and used by and for the Government of the United States of America for governmental purposes without payment of any royalties thereon or therefor.

What is claimed as new and desired to be secured by Letters Patent of the United States is:

1. In a depth charge of the character disclosed adapted to be launched within a body of water from an attacking craft, a streamline casing having a tubular member connected thereto and coincident with the axis thereof, a pair of opposedly connected gradiometer coils supported in predetermined space relation by said tubular member within said casing, an explosive charge arranged intermediate said casing and said tubular member, means controlled by the signals received from said gradiometer coils for detonating said explosive charge selectively in accordance with the gradient of the magnetic field adjacent the path of travel of the depth charge through the water, and means for continuously rotating said depth charge and gradiometer coils thereby to increase the sensitivity of the gradiometer coils to changes in the magnetic field during the travel of the depth charge through the water.

2. A depth charge of the character disclosed adapted to be launched from an attacking craft, a streamline casing for said depth charge, means secured to said casing for causing the depth charge to assume a vertical position within the water, means for causing the depth charge to rotate continuously while in said vertical position without substantial deviation of the axis of rotation thereof from the line of travel of the depth charge within the water, and means for firing said depth charge selectively in accordance with the gradient of a non-uniform magnetic field within which the depth charge travels, the sensitivity of said last named means being increased by the continuous rotation of the depth charge.

3. A depth charge of the character disclosed adapted to be launched within a body of water from an attacking craft, a streamline casing for said depth charge, means responsive to the gradient of a non-uniform magnetic field in the vicinity of the depth charge, said means being arranged within said streamline casing for detonating the depth charge, a plurality of safety devices detachably secured to said streamline casing for preventing the premature detonation of the depth charge by said detonating means until the safety devices have been detached from the casing, means for detaching said safety devices from the streamline casing as the depth charge is launched, and cylindrically enclosed screw-flight means extending radially from the rearward end of the casing and of substantially the same outside diameter thereof for causing the depth charge to assume a vertical position and rotate continuously during the descent of the depth charge within the water without substantial deviation of the axis of rotation thereof from the path of travel of the depth charge and for maintaining the maximum effective sensitivity of the said detonating means during travel thereof.

4. A depth charge of the character disclosed adapted to be launched from an attacking craft, a streamline casing for said depth charge, said casing having a pair of oppositely disposed apertures therein, an explosive charge adapted to be arranged within said casing through said apertures, means for sealing said apertures when the explosive charge has been arranged therein, means for firing said explosive charge, means including a pair of opposedly connected balanced gradiometer coils arranged in predetermined space relation within said casing for operating said firing means selectively in accordance with the gradient of a non-uniform magnetic field within which the depth charge travels, and means including an impeller device secured to said casing for causing said gradiometer coils to be rotated about an axis thereby to increase the sensitivity of the gradiometer coils to the gradient of said non-uniform magnetic field.

5. The method of exploding a depth charge having a pair of opposedly connected gradiometer coils which consists in launching the depth charge within a body of water, causing the depth charge to assume a vertical position within the water and rotate continuously during the descent thereof within the water about an axis coincident with the path of travel of the depth charge, and utilizing the gradient of a non-uniform magnetic field detected by said coils and within which the rotating depth charge travels for firing the depth charge when the gradient of said magnetic field has increased to a predetermined degree.

6. The method of destroying a submarine which consists in launching a depth charge having a pair of opposedly connected gradiometer coils within a body of water above the submarine, causing the depth charge to sink rapidly within the water, in causing the depth charge to rotate continuously about an axis coincident with the line of travel of the depth charge within the water, and in firing the rotating depth charge opposite the submarine under control of the gradient of the magnetic field set up by the submarine and detected by said coils.

7. In a depth charge of the character disclosed adapted to be launched within a body of water from an attacking craft, a streamline casing for said depth charge and symmetrically arranged about an axis, means secured to said casing adapted to cause the depth charge to be rolled along a surface in a straight path, means responsive to the pressure of the water within which the depth charge is launched for causing the depth charge to be quickly moved to a position with the axis thereof vertical and in coincidence with the path of travel of the depth charge within the water, means for continuously rotating said depth charge about said axis during the descent of the depth charge within the water without substantial deviation of the axis from said path of travel, a pair of balanced gradiometer coils arranged equidistantly on opposite sides of said axis and parallel thereto, an explosive charge within said casing, and means controlled by said gradiometer coils for firing said explosive charge selectively in response to the gradient of a non-uniform magnetic field within which the rotating depth charge travels.

8. A depth charge of the character disclosed adapted to be launched from an attacking craft, a streamline casing for said depth charge, means including an annular member secured to said casing at one end thereof in alinement with the axis of the casing and a cylindrical member secured to the opposite end of said casing in alinement therewith for causing the depth charge quickly to assume a vertical position during the downward movement thereof within the water, means including a plurality of flight members for causing the depth charge to be quickly brought to a maximum speed of rotation as the depth charge moves into said vertical position such that the axis of rotation thereof is substantially coincident with the line of travel of the deph charge within the water, and means including a pair of opposedly connected gradiometer coils diametrically arranged on opposite sides of said axis of rotation for firing said depth charge selectively in accordance with the gradient of a non-uniform magnetic field within which the depth charge travels.

9. A depth charge of the character disclosed adapted to be launched within a body of water from an attacking craft, a streamline casing for said depth charge, means for causing the depth charge to assume a vertical position during the downward movement thereof within the water, means for causing the depth charge to rotate continuously during the downward movement thereof through the water while in said vertical position such that the axis of rotation thereof is substantially coincident with the line of travel of the depth charge within the water, means adapted to fire the depth charge selectively in accordance with the gradient of a non-uniform magnetic field within which the depth charge travels, and means responsive to the pressure of the water for invariably firing the depth charge when the depth charge has reached a predetermined depth of submergence.

10. A depth charge of the character disclosed adapted to be launched within a body of water, an articulated casing for said depth charge of streamline shape comprising two sections joined together in sealed relation and having a tubular member connected thereto and coincident with the axis thereof, a rigid support secured to said tubular member, a pair of gradiometer pickup devices adapted to be supported by said rigid support, means for clamping said gradiometer pickup devices to said support in predetermined space relation with respect to said tubular member, firing control means arranged within said tubular member, a pair of curved tubular devices secured to said gradiometer pickup devices and said tubular member having a plurality of electrical conductors therein for establishing an external circuit connection between said gradiometer pickup devices and said firing control means, a pair of annular members secured to said casing having apertures therein of sufficient size to enable the gradiometer pickup devices to be clamped to said rigid support and the tubular members affixed thereto after said casing has been joined together, and means including a pair of covers adapted to be brought into engagement with said annular members thereby to seal the casing.

11. The method of detecting the presence of a ponderous mass of magnetic material having a gradient magnetic field thereabout which comprises moving a pair of opposedly connected and balanced gradiometer coils along a line of travel toward said mass, continuously rotating said coils about an axis disposed therebetween and coincident with said line of travel, and giving a signal indication when the gradient of said magnetic field detected by the coils reaches a predetermined value.

ROBERT H. PARK.
ROYAL WELLER.
ARTHUR G. RUSSELL.
SETH W. BOOTH.

References Cited in the file of this patent

UNITED STATES PATENTS

| Number | Name | Date |
|---|---|---|
| 1,272,461 | Kocialek | July 16, 1918 |
| 1,302,167 | Hubbard | Apr. 29, 1919 |
| 1,343,969 | Hampton | June 22, 1920 |
| 1,353,652 | Hampton | Sept. 21, 1920 |
| 1,383,106 | Hadaway et al. | June 28, 1921 |
| 1,639,665 | Pratt | Aug. 23, 1927 |
| 1,686,884 | Trenor | Oct. 9, 1928 |
| 1,780,592 | Johansson | Nov. 4, 1930 |
| 2,292,821 | Caulkins | Aug. 11, 1942 |
| 2,398,801 | Minkler | Apr. 23, 1946 |

FOREIGN PATENTS

| Number | Country | Date |
|---|---|---|
| 459,859 | France | Sept. 18, 1913 |
| 857,504 | France | Apr. 15, 1940 |